United States Patent
Herbert et al.

(10) Patent No.: US 7,303,075 B2
(45) Date of Patent: *Dec. 4, 2007

(54) NESTABLE STORAGE CONTAINERS WITH REVERSIBLY DEFORMABLE CLOSURES

(75) Inventors: Curtis B. Herbert, Saint Paul, MN (US); James C. Kolar, Saint Paul, MN (US)

(73) Assignee: Foldware, Inc., St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/580,355

(22) Filed: Oct. 13, 2006

(65) Prior Publication Data

US 2007/0045146 A1    Mar. 1, 2007

(51) Int. Cl.
B65D 21/00 (2006.01)
B65D 85/62 (2006.01)

(52) U.S. Cl. ..................... 206/515; 206/518

(58) Field of Classification Search ............... 206/515, 206/517, 518; 220/4.27, 23.83
See application file for complete search history.

(56) References Cited

U.S. PATENT DOCUMENTS

| | | |
|---|---|---|
| 291,022 A | 1/1884 | Beaupied |
| 644,680 A | 3/1900 | Ordway |
| 720,783 A | 2/1903 | Clough |
| 1,243,033 A | 10/1917 | Beatty |
| 2,064,411 A | 2/1936 | Brandstein |
| 2,080,108 A | 5/1937 | Brandstein |
| 2,266,270 A | 12/1941 | Roth |
| 2,564,448 A | 8/1951 | Ritscher |
| 3,556,338 A | 1/1971 | Wilkinson et al. |
| 3,595,428 A | 7/1971 | Mounts et al. |
| 3,642,165 A | 2/1972 | Von der Osten |
| 3,655,089 A | 4/1972 | Tower |
| 3,862,614 A | 1/1975 | Kovac |
| 3,901,405 A | 8/1975 | Norberg |
| 3,937,389 A | 2/1976 | Wind |
| 4,198,040 A | 4/1980 | Colasent |
| 4,391,386 A | 7/1983 | Moret |
| 4,467,939 A | 8/1984 | Warwick |
| 4,538,741 A | 9/1985 | Jacobs |
| 4,572,374 A | 2/1986 | Sirotkin |
| 4,685,567 A | 8/1987 | Webb |
| 4,712,725 A | 12/1987 | Moore |
| 4,765,480 A | 8/1988 | Malmanger |
| 4,815,628 A | 3/1989 | Wehnert |
| 4,844,248 A | 7/1989 | Forberg |
| 4,895,270 A | 1/1990 | Main et al. |
| 4,901,881 A | 2/1990 | McElroy |

(Continued)

FOREIGN PATENT DOCUMENTS

WO    WO 03/022702    3/2003

*Primary Examiner*—Anthony D. Stashick
*Assistant Examiner*—Harry A Grosso
(74) *Attorney, Agent, or Firm*—Dardi & Associates, PLLC

(57) ABSTRACT

Embodiments include nestable containers and reversibly deformable closures for the containers that are disposable in the nested arrangement. For example, materials and methods are described for making and using a storage apparatus having storage containers and closures for the containers, the storage apparatus including a plurality of nested storage containers each having an opening, and a plurality of reversibly deformable closures for covering the openings, with the containers being nestable with each other with one of the closures disposed between each nested container.

23 Claims, 7 Drawing Sheets

U.S. PATENT DOCUMENTS

| | | |
|---|---|---|
| 4,951,832 A | 8/1990 | Tenney et al. |
| 5,002,197 A | 3/1991 | Ponsi |
| 5,036,994 A | 8/1991 | McElroy |
| 5,184,745 A | 2/1993 | Havens et al. |
| 5,253,758 A | 10/1993 | Bissell |
| 5,330,069 A | 7/1994 | Jamison et al. |
| 5,353,948 A | 10/1994 | Lanoue et al. |
| 5,360,114 A | 11/1994 | Weidt |
| 5,392,915 A | 2/1995 | Kalin |
| 5,409,126 A | 4/1995 | DeMars |
| 5,415,312 A | 5/1995 | Mueller |
| 5,460,286 A | 10/1995 | Rush et al. |
| 5,678,720 A | 10/1997 | Van Melle |
| 5,692,617 A | 12/1997 | Adams |
| 5,769,229 A | 6/1998 | Andress et al. |
| 5,992,673 A | 11/1999 | Hwang |
| 6,036,049 A | 3/2000 | Hwang |
| 6,092,687 A | 7/2000 | Hupp et al. |
| 6,138,863 A | 10/2000 | Aiken |
| 6,260,729 B1 | 7/2001 | Mitchell et al. |
| 6,276,530 B1 | 8/2001 | Bailey |
| 6,276,551 B1 | 8/2001 | Miller |
| 6,405,890 B1 | 6/2002 | Ashley |
| 6,631,822 B1 | 10/2003 | Overholt |
| 2002/0070218 A1 | 6/2002 | Mozes |
| 2002/0092790 A1 | 7/2002 | Stucke et al. |
| 2002/0148845 A1 | 10/2002 | Zettle et al. |
| 2003/0136699 A1 | 7/2003 | McNeeley et al. |
| 2004/0099667 A1 | 5/2004 | Ackerman et al. |
| 2004/0099669 A1 | 5/2004 | Lown et al. |
| 2004/0191369 A1 | 9/2004 | Veillon |
| 2004/0251256 A1 | 12/2004 | Turvey et al. |

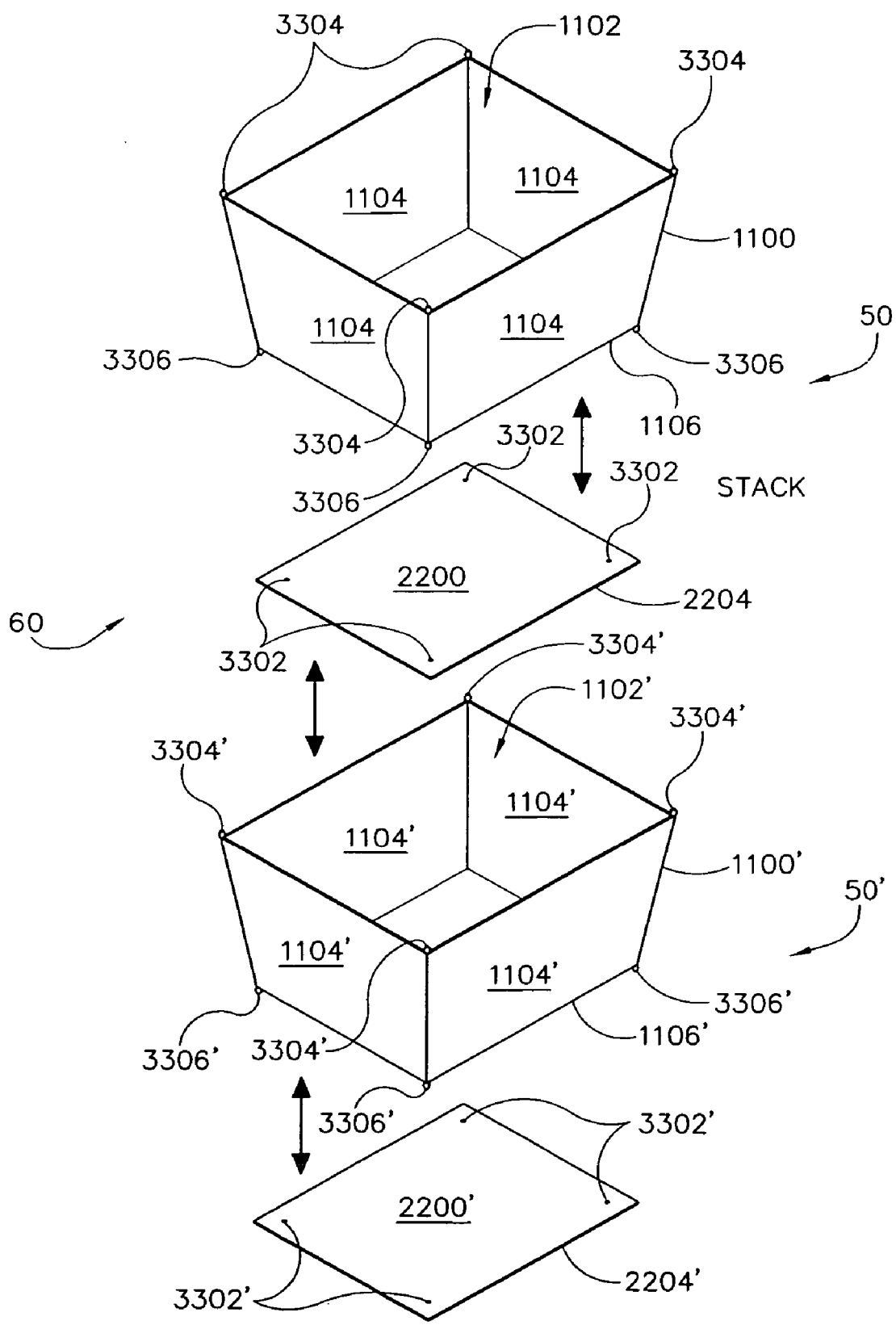

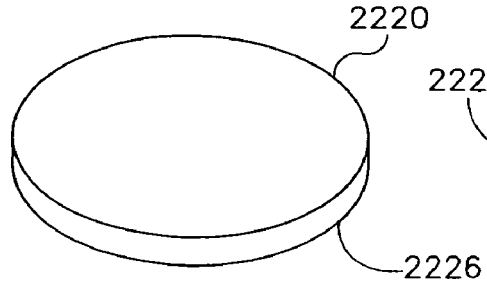
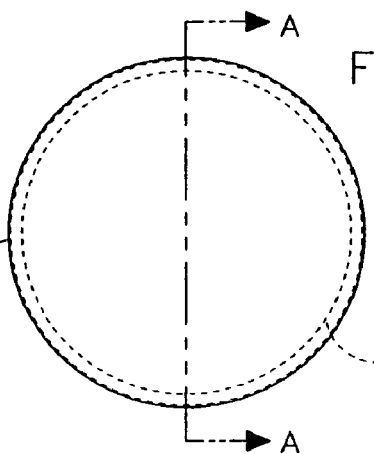
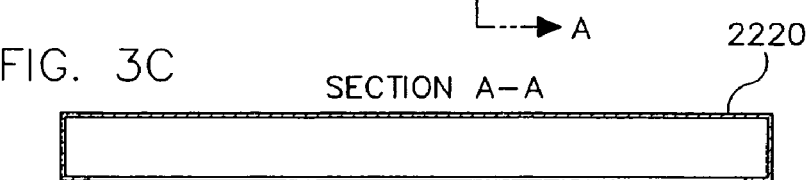
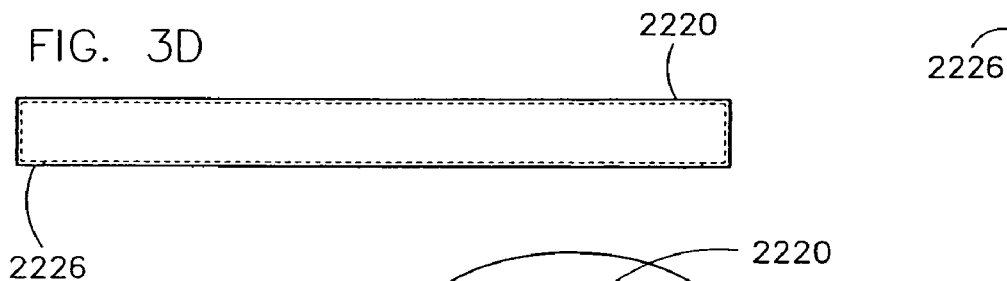
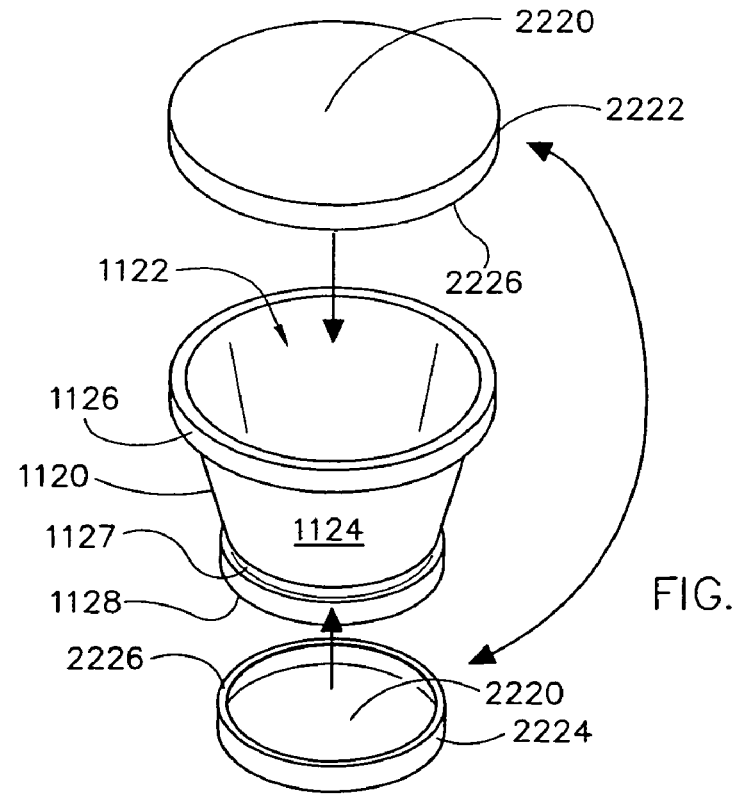

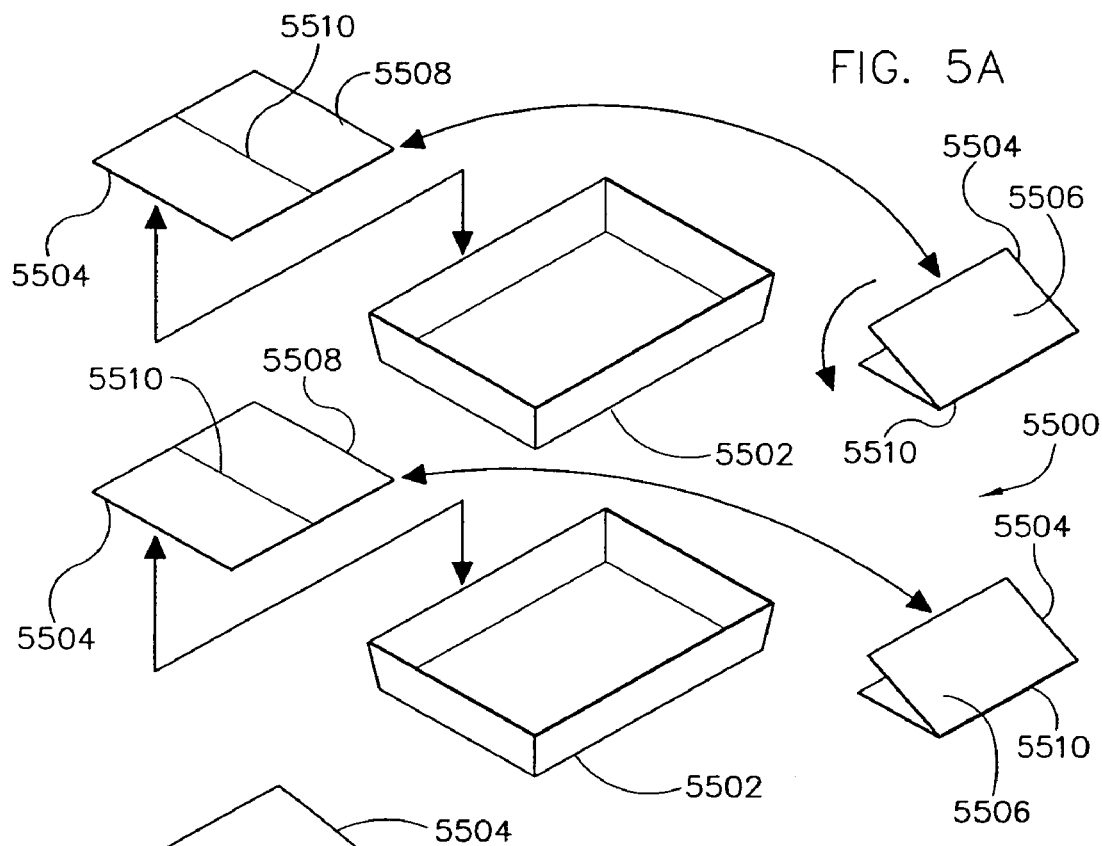
FIG. 5A
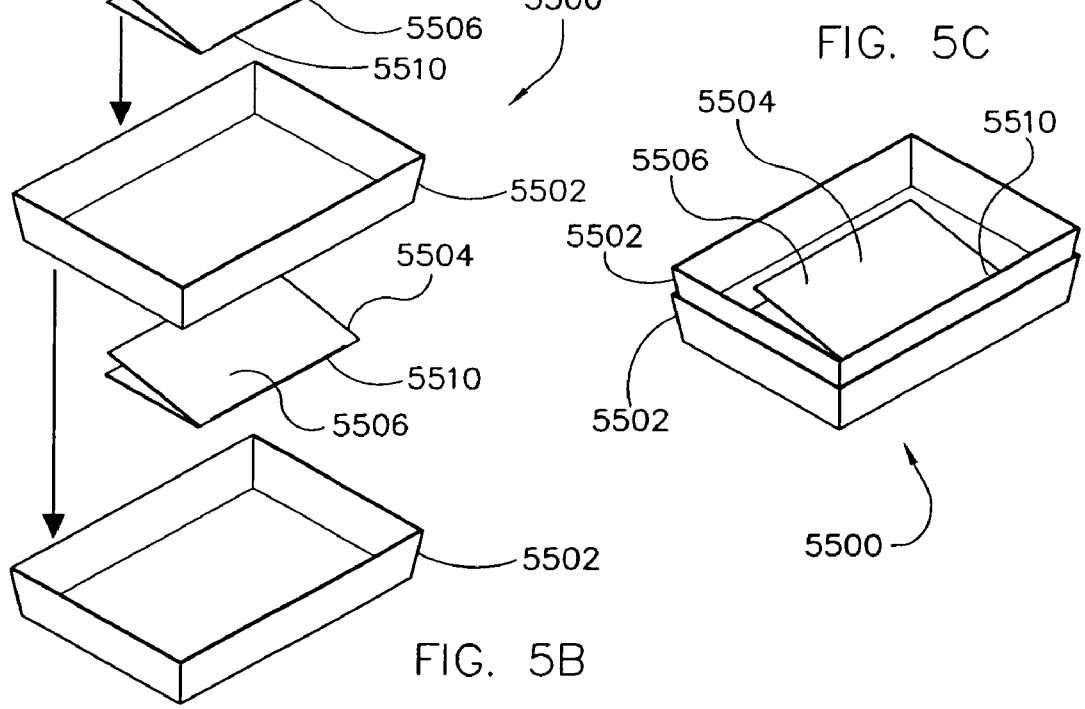
FIG. 5B
FIG. 5C

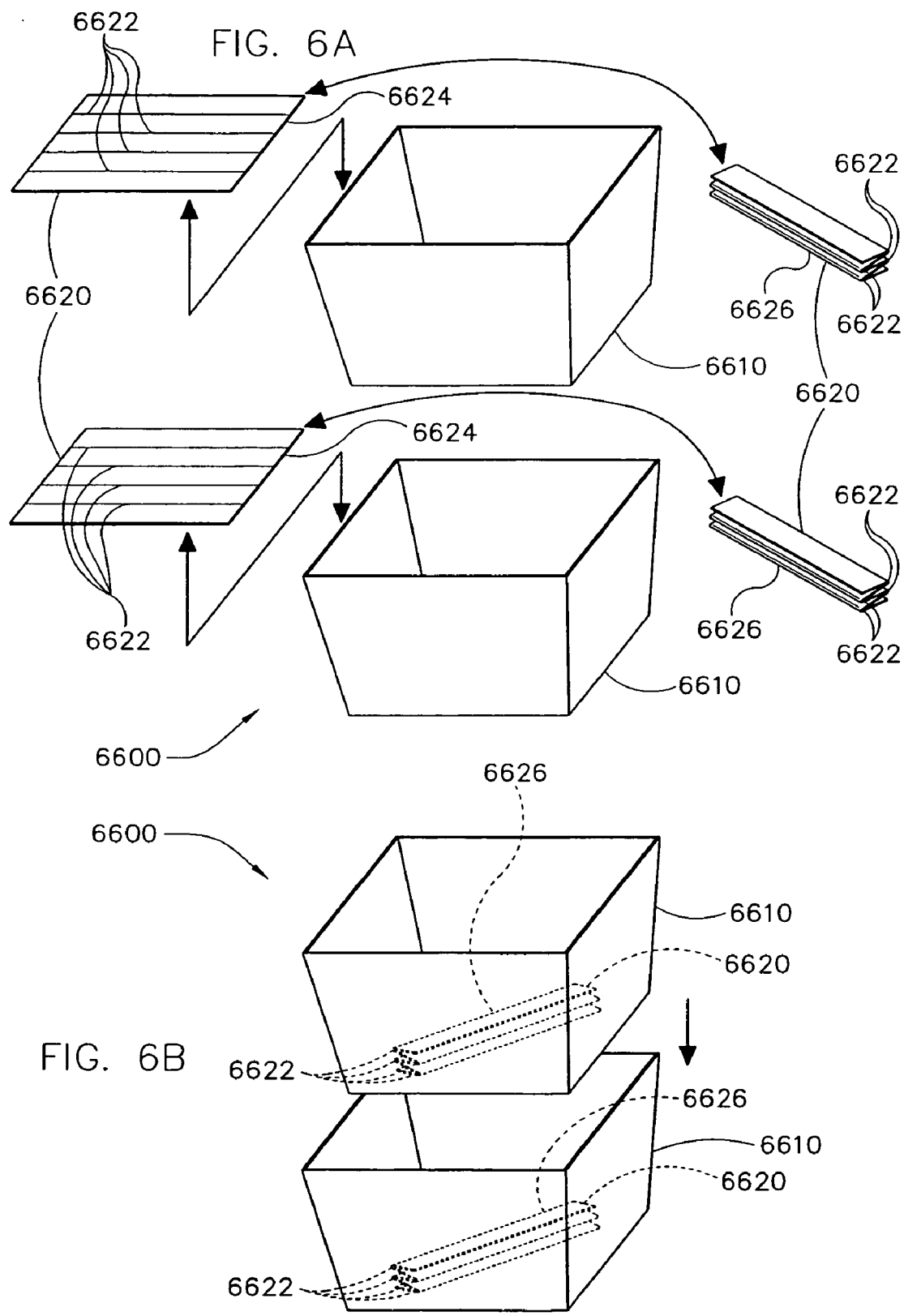

SECTION A-A

FIG. 8A
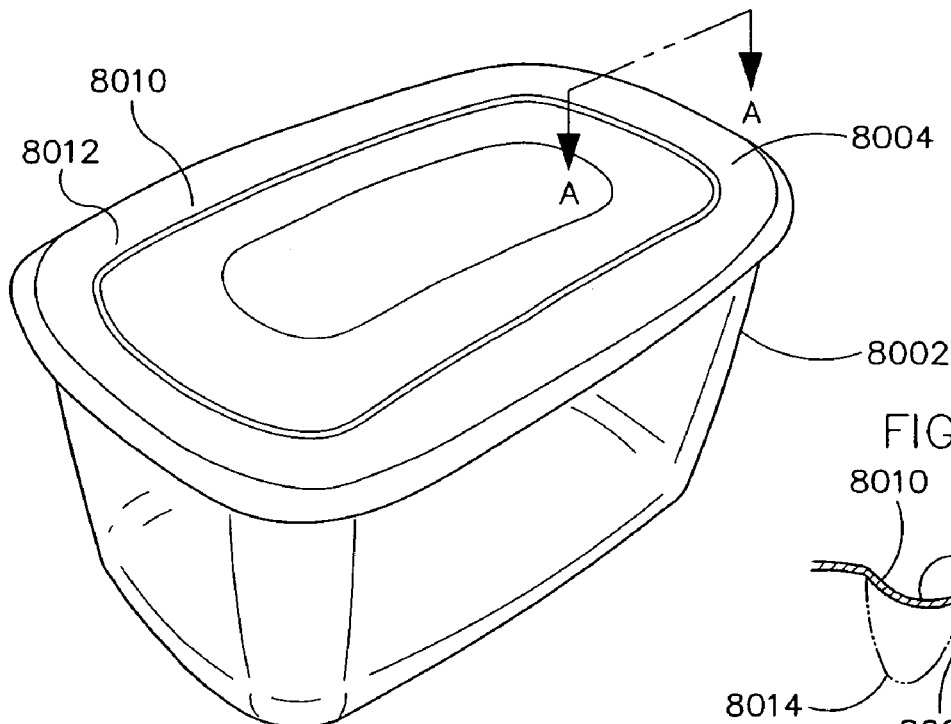
FIG. 8B
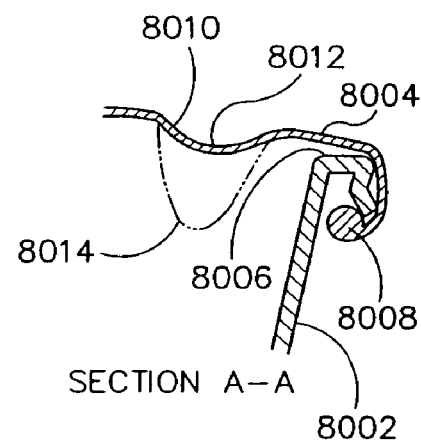
SECTION A-A
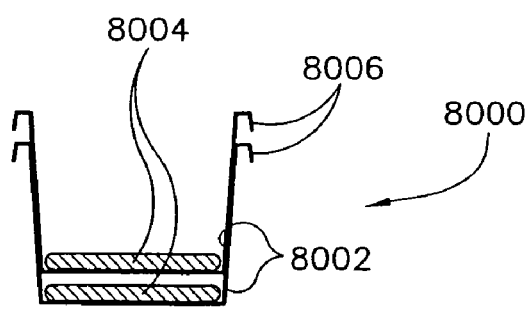
FIG. 8D
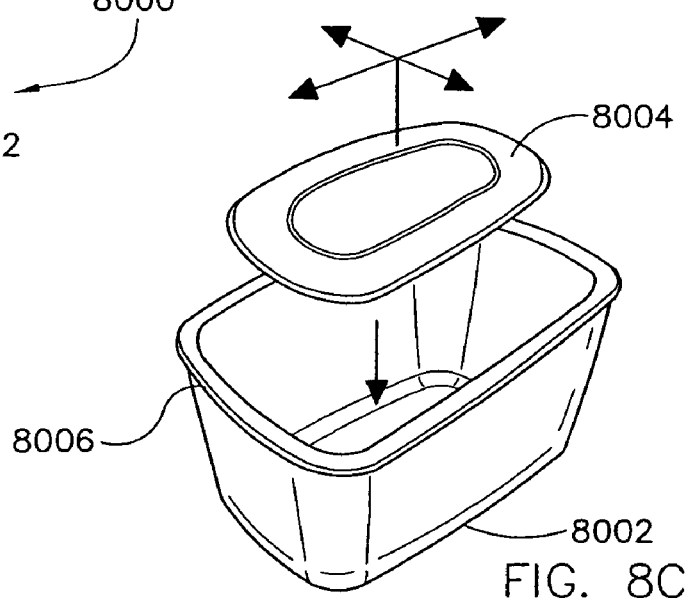
FIG. 8C

NESTABLE STORAGE CONTAINERS WITH REVERSIBLY DEFORMABLE CLOSURES

RELATED APPLICATIONS

This application claims priority to U.S. patent Ser. No. 10/974,553, filed Oct. 27, 2004, now U.S. Pat. No. 7,124,891, which claims priority to U.S. patent Ser. No. 60/514,956, filed Oct. 28, 2003 and also claims priority to U.S. patent Ser. No. 60/514,940, filed Oct. 28, 2003, each of which applications are hereby incorporated by reference herein.

TECHNICAL FIELD

The technical field is related to nestable containers and reversibly deformable closures for the containers that are disposable in the nested arrangement.

BACKGROUND

Food storage containers are popularly used to store food that is left over after a meal. The food is packed into the storage container, sealed, and placed into a refrigerator. Such food containers are typically reusable and made of plastic and have a lid. The lid seats snugly on the container to help preserve the food and isolate it from the environment.

SUMMARY

Many consumers own a variety of types of reusable food containers. Each type has its own lid. As a result, there is often a need to search through a variety of lids and containers to identify ones that match. The searching process is often inconvenient and frustrating. This application has identified this problem and provides certain inventive embodiments that address these difficulties.

One solution to this problem is to store the containers with the closures that fit them. Storage of the closures with the containers, however, is difficult because the containers can not be nested with each other while the closure is on the container. Therefore reversibly deformable closures are described herein that can be positioned between the containers while the containers are nested. The closures are in a first position while covering the containers, and are reversibly deformed to another position when stored in or on the containers, so that the containers may be nested with each other. The closures may then be restored to the covering position. Reversible deformation thus refers to a change in shape that is reversible, and may be used to refer to the transition from a covering position to a storage position, or vice versa.

Embodiments include food storage containers associated with a reversibly deformable closure that can be positioned to cover the container and deformed to fit inside the container. Then the containers may be nested, each with a closure still associated with them. The reversible deformation may be accomplished, e.g., by using an elastic material or a rigid material having a telescoping, stacked, folded, layered, and/or corrugated structure. And closures can be prepared that are deformed to be stored on the bottom of the container so as not to interfere with container nesting when not in use, but can be positioned to fit over the top of the container. Thus the lids can be stored with the containers so that they are not separated during storage.

Embodiments include a food storage apparatus having food storage containers and closures for the containers, the food storage apparatus comprising a plurality of nested food storage containers each having an opening; and, a plurality of reversibly deformable closures for covering the openings, wherein the containers are nestable with each other with one of the closures disposed between each nested container, and the openings each have the same dimensions. A reversibly deformable closure may have at least a portion that is an elastic material for reversibly deforming the closure, or the reversibly deformable closures may be made essentially of elastic materials. A surface area of the reversibly deformable closure may be increased by at least about 25% or 100% when the closure is disposed over an opening compared to the surface area of the closure in a resting position. A reversibly deformable closure may have a fold, or corrugations for reversibly deforming the closure, may have a detent, or could have a combination thereof. The reversibly deformable closures may include a nondeformable portion. Similarly, methods for using such apparatuses are includes, e.g., a method of storing a plurality of food storage containers, the method comprising nesting the plurality of containers with each other with a reversibly deformable closure disposed between the plurality of containers, wherein the plurality of containers each comprise an opening of the same dimension and the reversibly deformable closure may be used to cover the opening. Other embodiments are described, below, in the Detailed Description.

BRIEF DESCRIPTION OF THE FIGURES

FIG. 2 depicts a method to nest the container and closure of FIG. 1 in a stack with the closure disposed between the containers;

FIG. 3A is a perspective view of another embodiment of a reversibly deformable closure;

FIG. 3B depicts a top plan view of the closure of FIG. 3A;

FIG. 3C depicts a cross-sectional view along the line A-A of FIG. 3A;

FIG. 3D depicts a side view of the closure of FIG. 3;

FIG. 4 depicts another embodiment, with a container and its reversibly deformable closure that may be reversibly fixed to the top or bottom of the container;

FIG. 5A depicts another embodiment with a plurality of containers and a plurality of reversibly deformable closures having folds for reversible deformation;

FIG. 5B depicts the embodiment of FIG. 5A with the closure partially folded and the containers disposed for nesting;

FIG. 5C depicts the embodiment of FIG. 5B with the containers nested having one of the closures disposed between them;

FIG. 6A depicts another embodiment with a plurality of containers and a plurality of reversibly deformable closures having corrugations for reversible deformation, and further depicts the closures in a collapsed state of deformation;

FIG. 6B depicts the embodiment of FIG. 6A with the closures disposed in the containers, which are positioned for nesting with each other with one of the closures disposed between them.;

FIG. 8A is a perspective view of an alternative embodiment of a set of containers and reversibly deformable closures;

FIG. 8B is a sectional view along line A-A of FIG. 8A;

FIG. 8C is a perspective view of the embodiment of FIG. 8A showing a closure positioned for placement into a container; and, FIG. 8D is an elevated cross-sectional view of the embodiment of FIG. 8A, with the containers and closures being nested together.

DETAILED DESCRIPTION

Figure 1:
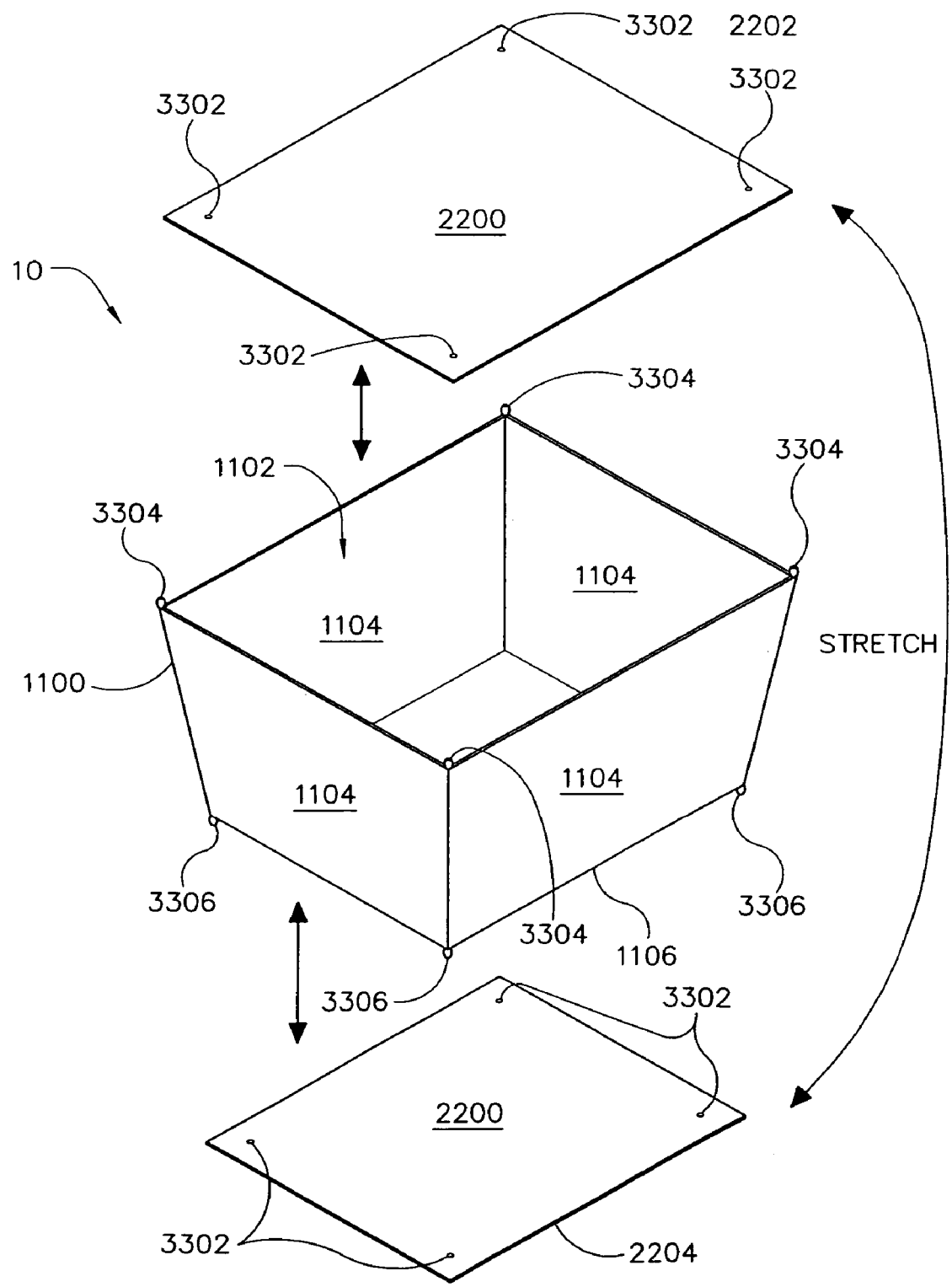
FIG. 1 depicts a container and associated reversibly deformable closure attachable over the opening of the container or to the bottom of the container.
Figure 7A:
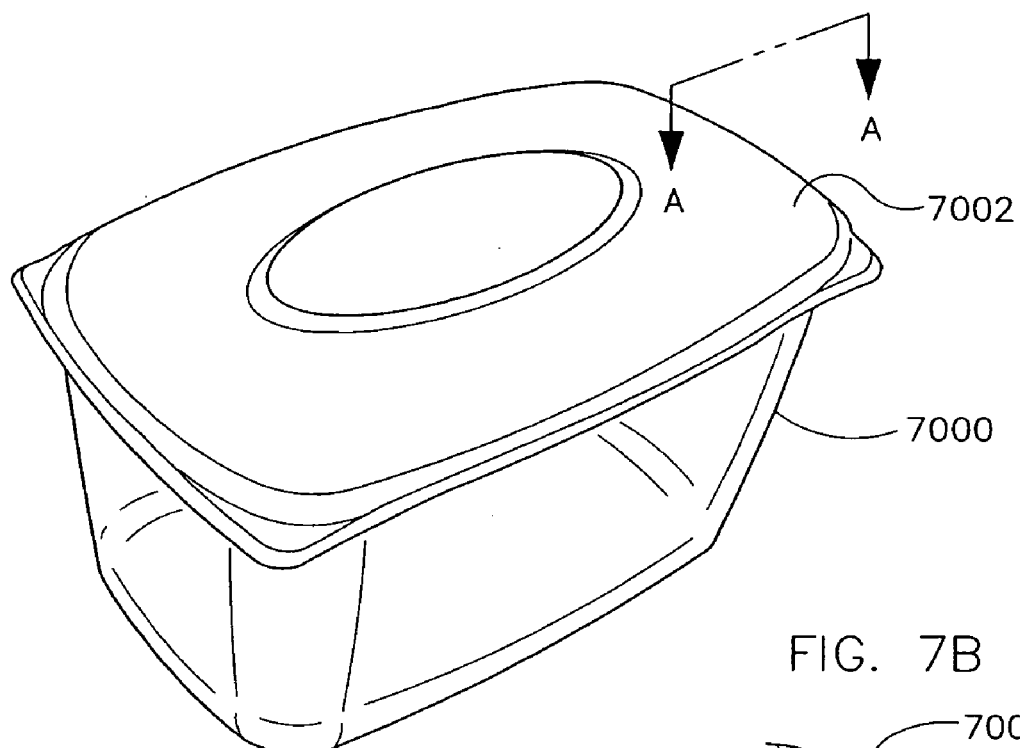
FIG. 7A is a perspective view of an alternative embodiment of a set of containers, and reversibly deformable closures.
Figure 7B:
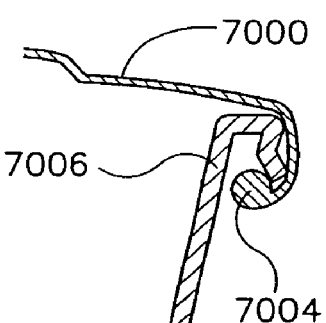
FIG. 7B depicts a cross-sectional view along the line A-A in FIG. 7A.
Figure 7D:
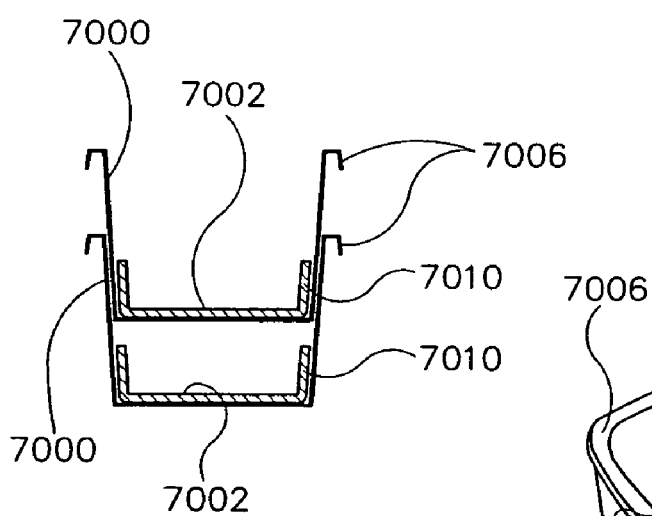
FIG. 7D is an elevated cross-sectional view of the set of FIG. 7, showing the containers and closures nested together.
Figure 7C:
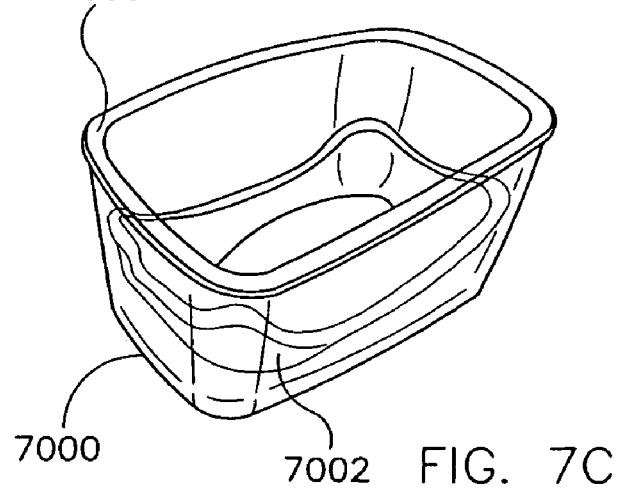
FIG. 7C depicts a perspective view of the set of FIG. 7, with the closure being positioned for placement in the container.

Closures are provided that may be stored in or on a container, and certain embodiments provide for such storage even when the container is nested with other containers. This method of storage conveniently keeps the containers and closures together. An embodiment is a closure, e.g., a lid, for a container, the closure having a reversibly deformable member. Reversible deformation may be accomplished by using elastic materials, and/or by providing structures that allow a change in shape, e.g., folded or corrugated. The closure may be reversibly deformable, e.g., to have a change in surface area or projected surface area. The change from a first shape to a second shape allows for the closure to be used/stored in a first shape and stored/used in a second shape. Thus the closure may be stored in a first shape and kept in association with the container, and then the closure may be altered to a second shape to fit on the container.

Container is a term that includes a container that fully encloses a space, or partially encloses a space. Certain embodiments involve the use of containers that have a shape that encloses a space on all sides except for an opening. For example, a bowl, box, carton, envelope, bottle, or jug may be enclosed on all sides except for an opening. Alternatively, a container may be prepared with multiple openings. Certain embodiments relate to a container that is fully or partially enclosed. Certain embodiments relate to a container that has multiple detachable sections. The container may be reusable or disposable. While a food storage container is described as a preferred embodiment, other types of containers are also contemplated. A closure refers to a structure or device designed to close off the opening of a container and prevent loss of its contents; this terminology is consistent with that provided by the United States Container Corporation on its website at the time of filing. Closures may involve various means of securing the closure to the container, e.g., fasteners, friction fit, threads, ribs, force-fit, and other means known to artisans in these fields.

Containers, closures, and sections of the containers may be assembled from materials that are used for conventional containers. Such materials include, for example, woods, plastics, ceramics, cloths, textiles, fabrics, weaves, and metals. Plastics include, for example, polyethylene, polycarbonate, polyvinylchloride, high density polyethylene, polypropylene, polystyrene, polytetrafluoroethylene, polyurethane, silicones, and various elastomers. Containers for food storage should be made of food grade materials that do not undesirably contaminate the food with undesirable substances.

Elastic articles, e.g., containers, closures, and sections thereof, may be made with materials that are reversibly deformable, for example, from natural or synthetic rubbers, or rubbery materials. Examples of materials for deformable sections include neoprene, nitrile, polyisoprenes, fluoroelastomers, ethylene/acrylics, silicones, butyl rubbers, SBR, EPDM, VITON, combinations and derivatives thereof, and other materials, e.g., as in the Handbook of Plastics and Elastomers. Liquid silicone rubbers are expensive, but are useful materials that are highly elastic, food-compatible, and suitable in a range of temperatures from freezing to boiling. Other specific materials that may be suitable, depending upon specific designs and uses, are SANTOPRENE, KRAYTON, ENGAGE, ESTANE, and DOW CORNING SILASTIC. Sources for materials include, for example, American Cyanamid Company, B. F. Goodrich Chemical Company, Copolymer Rubber & Chemical Corporation, Dow Corning Corporation, E. 1. Dupont de Nemours, Federal Mogul Corporation, Goodyear Tire and Rubber Company, Malaysian Rubber Bureau, Parker Seal Company, Polysar Limited, Precision Rubber Products Corporation, Sargent Industries, Thiokol Corporation, 3 M Company, Dow, and Uniroyal Industries Products.

An alternative to an elastic material is a reversibly deformable material or structure that is not elastic. For example, a structure or material that is deformed by a first mechanical force and requires a second mechanical force to restore the material to its first configuration is reversibly deformable. Such structures may be, e.g., a corrugated plastic that has a first shape and is stretched to achieve a second shape, such as a substantially flat shape. Alternative structures are telescoping, nested, stacked, folded, and layered structures.

For example, a closure may be prepared that is folded in a storage position so that it has a relatively small projected area relative to its unfolded state. Thus a user may fold a closure, dispose it in or under a container, and nest the container with other containers of a similar or substantially identical size and shape. Then the closure may be unfolded and used as a lid for the container. Or, for example, a closure may be prepared that is collapsed in a storage position so that it occupies a relatively small volume relative to its uncollapsed state. Thus a user may expand the closure, dispose it in or under a container, and nest the container with other containers of a similar or substantially identical size and shape. Then the closure may be expanded and used as a lid for the container. The collapsing and expanding may be accomplished, for example, by use of corrugations in the closure. Alternatively, a telescoping or layering structure may be used to accomplish the same.

Alternatively, elastic materials may be joined with less elastic materials, or rigid materials to make a reversibly deformable closure. For example, two essentially rigid portions of a closure may be joined by an elastic portion. In use, the closure is expanded by pulling in the rigid portions and fastened to the container to cover it. The closure is removed, and the elastic portion causes it to contract to a shape with a smaller surface area. The closure is then stored in the container, and the containers may be nested with each other. Alternatively, the elastic portion may serve as a hinge to allow folding of the closure to achieve a smaller projected surface area. Or these embodiments may be combined.

One measure of the change in the state of a closure between two positions is the change in surface area. A measurement of a surface area is accomplished by adding up the entire area of the surface, and is not to be confused with the projected surface area of an object. For example, a stretchable rubber sheet increases its surface area when it is stretched. In contrast, an essentially unstretchable material bounded by an elastic band of rubber material can have its projected area changed by stretching the band over an object, but the band's stretching essentially does not change the surface area of the object because the unstretchable material remains the same size. A projected surface area is the projection of an object onto a two-dimensional surface. For example, a corrugated closure has substantially no change in its surface area as the corrugations are flattened, but the projected surface area is changed.

Elastic materials for the embodiments are those materials that can have their surface area appreciably changed using the manual force generated by an average man or woman. It is appreciated that most materials have some measurable elasticity, especially if the appropriate machine is harnessed to stretch the material. Suitable materials, however, are those that can be stretched using manual force. To determine a range for manual force, a digital, spring scale (0 to 50 pounds) was attached to one of the narrow ends of a rectangular food storage container. A standard cover that had been cut in half across the width was placed onto the container to restrain the sides and to make the area that would be held by the user during application of the closure more realistic. The load applied was measured at peak applied load and at steady applied load approximately 15 seconds after the person began to pull the scale. A steady state load would be a comfortable load for most persons and the peak load would approach the amount of force that would not be comfortable. Four persons were tested two or three times each. and an average steady applied load was measured as being 8.6, 7.0, 14.9, and 8.4 pounds, for an average of about 9.7 pounds. The average peak values were 11.5, 9.2, 17.3, and 10.2 pounds, for an average of 12.1 pounds. These values serve as benchmarks to indicate the approximate range of some values for some typical users.

The closures, if they apply a compressive force to a container, should not exceed the crush strength of the container. A GLADWARE polypropylene food storage container was tested using an INSTRON mechanical tester, and determined in compression to deform at about 109 lbf. with a stress of about 9.6 ksi. In tension, the container was determined to have a maximum wall strength of about 104 lbf at 2.25 inches. Although only one container was tested, these values are benchmarks for the tensile and compressive strength of this category of container.

The stiffness appropriate for a covering, container, or portion thereof can be tailored to the application. A test of stiffness is the 5-centimeter (cm) stiffness test. The 5-cm stiffness test may be performed by preparing the article, a representative portion thereof, or a representative a sample of its material that is roughly square and about 6 cm on a side. The material is leveled parallel to the ground with one side fixed in its middle in a clamp. A weight, or a force, is placed on the material about five centimeters horizontally away from the clamp. The force that bends the material enough to allow the weight to slide off of the material is the 5-cm stiffness test value. Most reusable applications require a material that has enough stiffness to support a force of a gram, or a few grams, at a distance of five centimeters. Household plastic wraps have a 5-cm stiffness of less than 1 gram, e.g., thin polyethylene or polyvinylchloride sheets used to secure leftovers of meals. Indeed, such wraps can not even be configured for the test because they have a very low stiffness and therefore have a 5-cm stiffness of less than 1 gram. Further, these types of wraps are not reversibly deformable; upon use, they are stretched to close a container, and upon release from the container do not effectively recover their original, unstretched shape.

Some embodiments are food storage containers for home use, e.g., for meal leftovers. Although food storage containers for home use have a multiplicity of uses that are not limited to storage of food or use at a home, such containers are made to comply with certain requirements for food safety. Some embodiments are directed to using food-grade materials, microwaveable materials, materials resistant to deformation in the conditions typically encountered in automatic dishwashers, freezable materials, materials for use in a household oven, and/or materials that do not give off harmful substances in normal use.

Moreover, food storage containers for home use have limited dimensions so that a plurality of them may be accommodated within a home storage space, e.g., a refrigerator or pantry. Sizes and suitable ranges of sizes are may be described volumetrically in terms of the number of ounces of water that they hold: from about one ounce to about 512 ounces, and every size therebetween, every range of sizes therebetween, and ranges from any size therebetween to almost zero. Such sizes therefore include, for example: about one half-pint, about one pint, about one quart, about two quarts, and about one gallon. Such ranges therefore include, for example, from about one quarter pint to about one gallon or to about two quarts. Such ranges therefore include, for example about 5 ounces to about 20 ounces.

Moreover, food storage containers for home use may have a range of thicknesses when plastic is the material used for the container; these ranges are dictated by the engineering characteristics of the materials, as well as consumer perceptions such as the look and feel of the product. Thickness may include, e.g., the following fractions of an inch: one quarter, one eight, one sixteenth, one thirty second, and one sixty fourth.

Containers include shape stable containers. A shape stable container essentially maintains its shape when items are placed within it; for example, a bucket, a carton, a milk jug, or a box. A shape stable container does not typically to tend to conform its shape to accommodate the items placed within it. A shape stable container may have an elastic portion but still retain its classification as a shape stable container because the elastic member does not typically conform to the items within it, even though the elastic member may sometimes bend or be displaced. For example, many consumers are familiar with plastic food storage bags dispensed from rolls that are not shape stable, e.g., those bags popularly referred to as sandwich bags or freezer bags.

Another embodiment is a storage device having a closure and a container comprising an opening, with the closure being securable over the opening and comprising a reversibly deformable portion having a surface area or a projected surface area that is increased by at least about 15%, e.g., by at least about 25%, by at least about 50%, or by at least about 100%, when the closure is secured over the opening. In some embodiments, the closure may be stored on the bottom or a side of the container without occluding the opening. In general, an increase in surface area is associated with convenience in storage, since a small closure may be conveniently stored. This increase, however, is, in general, offset by an increased force for use, which is less convenient for a user. Further, an increase in elasticity is often accompanied by changes to other material properties, such as hardness, tackiness, and toughness. The balancing of these factors can be achieved by using design principles described herein in association with consideration of the properties of the materials that are chosen.

Embodiments include a container that comprises a nestable shape wherein a plurality of the containers occupy less space when nested as compared to the space occupied when the plurality of containers are not nested. Some nestable containers have openings that receive the bottom of another container, e.g., a nested stack of reusable/disposable food containers that are commonly available at retail stores. The nesting may be essentially complete or partially complete. Essentially complete refers to containers that are nested so that the interior volume of one container is essentially filled by another. Partially complete refers to nesting wherein a first container fits inside a second container but leaves a portion of the second container's interior volume unfilled, e.g. between about 1% and about 75% of the volume of the container (i.e., 99% to 25% of the container is filled); persons of ordinary skill in these arts will immediately appreciate that all values and ranges between the explicitly stated range are contemplated.

Closures may be made to have a surface area or projected surface area that is increased when placed over an opening of a container. The increase of the surface area or projected surface area may be, for example, at least about 5%, e.g., at least about 15%, at least about 25%, at least about 50% and at least about 100%. Ranges of increased surface area may be, e.g., 5%-1000%, and all ranges therebetween, e.g., 5%-500%, and 15%-350%; persons of ordinary skill in these arts will immediately appreciate that all values and ranges between the explicitly stated ranges are contemplated. As already described, embodiments include containers with a volume in the range between about 1 ounce and about 512 ounces, and coverings or containers made of plastic that is at least about one sixteenth of an inch thick. A sampling of reusable food container designs in the range from 4 ounces to 56 ounces that are presently on the market shows approximate dimensions for the interior bottom compared to the exterior top edge of the containers, see Table 1. The ratio of the outside top to inside bottom circumference ranged from about 1.3 to about 2.0, and the ratio of the top opening size to interior bottom ranged from about 1.6 to 3.1. These ratios provide some indication of some closure dimensions from a manufacturing and end-user applications perspective, and provide insight into the amount of stretch or change in area that is required when using a reversibly deformable closure as described herein.

TABLE 1

Dimensions of some commonly available reusable food containers

| Size Oz. | Shape | Source | Di | Do | Do/Di | $Do^2/Di^2$ |
|---|---|---|---|---|---|---|
| 4 | Round | GLAD | 2 | 3.25 | 1.6 | 2.6 |
| 8 | Round | ZIPLOC | 2.75 | 4.25 | 1.5 | 2.4 |
| 32 | Round | DIXIE | 4.125 | 5.25 | 1.3 | 1.6 |
| 20 | Square | ZIPLOC | 4.125 | 5.5 | 1.3 | 1.8 |
| 14 | Round | ZIPLOC | 3.5 | 5.5 | 1.6 | 2.5 |
| 32 | Square | ZIPLOC | 4 | 5.625 | 1.4 | 2.0 |
| 32 | Round | GLAD | 3.5 | 6 | 1.7 | 2.9 |
| 24 | Round | GLAD | 3.25 | 6.375 | 2.0 | 3.8 |
| 25 | Square | GLAD | 5 | 6.625 | 1.3 | 1.8 |
| 56 | Round | ZIPLOC | 4 | 7 | 1.8 | 3.1 |

Note for Table:
Do is outer diameter or length of a side; Di is inner diameter or length of a side at interior bottom; measurements performed using a ruler and are approximate.

Embodiments of closures include those having a surface area of any size suitable for the intended container. For example, the closure, when stretched, may have a surface area that is a range of about 1 to about 1,000 square inches when the covering is stretched, including all ranges therewithin, e.g., about 4 to about 64 square inches, about 9 to about 36 square inches, and about 9 to about 36 square inches; persons of ordinary skill in these arts will immediately appreciate that all values and ranges between the explicitly stated ranges are contemplated.

Referring to FIG. 1, storage apparatus 10 has container 1100 and reversibly deformable closure 2200. Container 1100 has opening 1102 defined by sides 1104, which are joined to bottom 1106. Container 1100 has posts 3304 and posts 3306. Closure 2200 has holes 3302. In use, closure 2200 is expanded to stretched configuration 2202 and placed over opening 1102 and fastened to the container by placing posts 3304 into holes 3302. Closure 2200 is removable and may be relaxed from stretched configuration 2202 to a storage configuration 2204 and optionally stored on bottom 1106 of container 1100 by placing posts 3306 into holes 3302. The storage configuration 2204 may be a fully or partially relaxed state. Some embodiments substitute other fasteners for post fasteners and hole fasteners. Various fasteners and seals may be used to join a closure to a container. Further, the degree of sealing may be controlled and varied, so that some seals are water tight while others merely provide a snug seating arrangement to generally isolate the container contents from the outside environment. For example, flanges, grooves, beads, and various means for establishing a seal between a container and a closure, as known to persons in these arts, may be used. For example, means for joining a lid to a container as employed in food containers sold under the GLADWARE, ZIPLOC, RUBBERMAID, or DIXIEWARE brands may be used. The opening of the containers may be located in the top, side, or bottom of the container and the closure may be placed over the opening in such embodiments.

FIG. 2 shows nestable apparatus 60 having subcomponents 50, 50', that include containers 1100, 1100' and reversibly deformable closures 2200, 2200'. Containers 1100, 1100' have openings 1102, 1102' defined by sides 1104, 1104', which are joined to bottoms 1106, 1106'. Containers 1100, 1100' have posts 3304, 3304' and posts 3306, 3306'. Closures 2200, 2200' have holes 3302, 3302'. In use, closure 2200, 2200' is stretched to stretched configuration 2202 (not shown) and placed over opening 1102, 1102' and fastened to the container by placing posts 3304, 3304' into holes 3302, 3302'. Reversible deformable closure 2200, 2200' is removable and may be relaxed from stretched configuration 2202 (not shown) to a storage configuration 2204, 2204' and optionally stored on bottom 1106 of container 1100 by placing posts 3306, 3306' into holes 3302, 3302'. The storage configuration 2204, 2204' may be a fully or partially relaxed state. Arrows indicate the nesting of the containers with the reversibly deformable closures.

Referring to FIGS. 3A-3D, closure 2220 is circular and has L-shaped lip 2226, which projects approximately perpendicularly from surface of closure 2220 and then bends at about ninety degrees to form an "L" shape. FIG. 4 shows container 1120 with upper flange 1126, round side 1124, recess 1127, and lower flange 1128. Closure 2220 may be stretched to stretched configuration 2222 and fastened over opening 1122 by pressing and snapping lip 2226 over flange 1116. Closure 2220 may be relaxed to storage configuration 2226 and pressed against flange 1228 until lip 1226 snaps in place around flange 1128, with lip 2226 being received by recess 1127. Closure 2200 may be reversibly separated from container 1120 by pulling closure 2220 from the container. Container 1124 may be nested with identical or similar containers, and may include closure 2220 in the storage position on the bottom of the container so that the closure is disposed between the containers when the containers are nested.

FIGS. 5A-5C depict a reversibly deformable closure having a fold. The fold allows the closure to be changed from a storage position to a covering position. The set 5500 of closures and containers has containers 5502 and closures 5504, which may be moved from a storage configuration 5506 to a covering position 5508 by folding the closure along hinge 5510. In use, closures 5504 may be used to cover containers 5502, with closures 5504 being in the covering position 5508. The closures 5504 may be removed from the containers and placed into a folded, or storage, position 5506, by folding them along hinge 5510. The closures 5504 may then be placed inside a container, and the containers nested with each other, with the closures disposed between the nested containers, as shown in FIG. 5B and FIG. 5C. A single hinge has been depicted, but a plurality of hinges may be used, including hinges that are parallel to each other, perpendicular to each other, or a combination thereof. For example, two hinges may be used to divide a closure into approximately three sections so that the outermost two sections may be folded inwards to reduce the projected surface area of the closure. Or, for example, two hinges may be perpendicular to each other and intersect at approximately the center of the closure, so that the closure may be folded approximately into quarters to have a projected surface area about one-fourth of its maximum unfolded area.

FIGS. 6A and 6B depict a reversibly deformable closure having a plurality of corrugations that are movable to increase or decrease the surface area of the closure. Set 6600 has containers 6610 and reversibly deformable closures 6620. Closures 6620 have a plurality of corrugations 6622. In use, closures 6620 may be expanded and to a first position 6624 for covering the containers and a collapsed position 6626 having a decreased projected surface area, and stored inside containers 6610, which may then be nested with each other, with closures 6620 disposed between the nested containers. The coverings may be joined to the containers using a variety of different types of fastening systems, including the types that are in common use among suppliers/brands such as GLADWARE, ZIPLOC, RUBBERMAID, and TUPPERWARE. A wide variety of fastening systems are contemplated. For brevity, however, only a few are depicted in this application.

FIG. 7 depicts container 7000 having reversibly deformable closure 7002, that is fastenable over the opening of container 7000. FIG. 7B shows detail from line A-A indicated in FIG. 7A; with rim 7004 of closure 7002 fitting around flange 7006 of container 7000. FIG. 7C shows how closure is flexibly and reversibly deformed to be tucked inside container 7000. FIG. 7D shows a cross-sectional view depicting the closure 7002 in place inside the containers when the containers 7000 are nested with each other, and shows portions 7010 that are not in contact with the bottom of the container. Instead, portions 7010 are in contact with the interior sides of the container. The reversibly deformable closure 7000 may be made to have essentially no change in its surface area, using materials that are flexible, and not necessarily stretchable. The flexibility of the closures allows for a change in projected surface area, as depicted in FIG. 7d, without a change in actual surface area. Although portions 7010 are not contacting the container bottom., the containers may nonetheless be nested with each other.

Alternatively, an elastic reversibly deformable material may be used to make closure 7002., or a similar closure. The closure is stretched to increase its actual surface area in the covering position, and contracts in a storage position. If the material has sufficient elasticity, it will lie completely on the bottom of the container, and the area of portions 7010 is effectively zero. A less elastic material may be used, so that the portions 7010 have an increased surface area. The size and shape of the container, the degree of desired nesting, and the choice of materials for the container or closure will all affect the shape and dimensions of the closures that are chosen.

FIG. 8 depicts another embodiment of a set having containers and reversibly deformable closures. The set 8000 has containers 8002 and closures 8004. Containers have flange 8006 that receives the closure rims to form a seal. Closures 8004 have rims 8008 and detent 8010. Detent 8010 has a relatively curved storage position 8014 at rest and a relatively flattened position 8012 when deployed to cover a container. In use, closure 8004 may be placed over container 8002 to cover the container. In this position, detent 8010 is relatively flat, see FIG. 8B. The closure 8004 may be removed, and allowed to contract, see FIG. 8C. The closure is then stored with the containers, which may be nested together with the closures disposed between the containers, see FIG. 8D. The detent 8010 may serve to create a bias in the closure to cause it to contract and movement between positions 8012 and 8014 allows for a change in the projected area of the closure.

Sets of containers and reversibly deformable closures may be assembled. The closures may be disposed between the containers while the containers are nested with each other. The number of containers in such a set may be, e.g., at least 2, at least 3, at least 4, or at least 5. Or, for example, the number of such containers may be between 2 and 10, or between, e.g., 3 and 8. The set may have one closure per container. Alternatively, the number of closures may be more or less than the number of containers, e.g., as when providing a closures that fits many sizes of containers. The containers may be similar to each other in size and shape, e.g., essentially identical, or essentially identical for nesting purposed. The containers may all have openings that are essentially the same size, e.g., having the same dimensions, e.g., length, width, or diameter. Alternatively, variously sized containers may be used in the set. The closures may be essentially identical to each other, e.g., having essentially the same dimensions, e.g., length, width, or diameter, or may be variously sized.

Another embodiment is a stretchable section of a container, the stretchable section having an elastic member. The elastic member is deformable so that the stretchable section may be reversibly stretched to have a change in area or dimensions. The change from a first shape to a second shape allows for the stretchable section to be used/stored in a first shape and stored/used in a second shape. Thus the stretchable section may be stored in a first shape and kept in association with the container, and then the stretchable section may be stretched to a second shape to fit on the container. Or the stretchable section may be stretched in storage and unstretched in use. Alternatively, the stretchable section may be fully or partially stretched in storage or use. The elastic member may be a portion of the stretchable section or the elastic member may be the entire stretchable section. The elastic member or container may be reusable or disposable. Thus, for example, a container may be equipped with a flap or flaps for closing over the opening in the container, with the flaps being reversibly deformable, e.g., elastic.

Embodiments with various features have been described herein. Other embodiments may combine these features. The various embodiments are intended to convey the spirit of the invention so that persons of ordinary skill in the art can practice the invention in its full scope without being limited to the particular embodiments herein. Further, all publications and patent applications described herein are hereby incorporated by reference.

It is claimed:

1. A storage apparatus having storage containers and detachable, reversibly deformable closures reversibly movable between a covering position for fastening to and covering the containers and a storage position for storing the closures, the storage apparatus comprising:
a plurality of nested shape stable storage containers each having an opening; and,
a plurality of reversibly deformable closures for reversibly fastening to the containers in the covering position to cover the openings to thereby form a substantially watertight seal with the containers, with the closures being detachable from the containers,
wherein the containers are nestable with each other with one of the closures in the storage position to thereby be disposed between each nested container and entirely within one of the containers, and the openings of the containers each have the same dimensions and at least one of the reversibly deformable closures comprises a nondeformable portion, and
wherein a projected surface area of the reversibly deformable closure is increased by at least about 25% when the closure is disposed over an opening compared to the projected surface area of the closure in a storage position.

2. The apparatus of claim 1, wherein at least one of the reversibly deformable closures comprises an elastic material for reversibly deforming the closure between the covering position and the storage position.

3. The apparatus of claim 1, wherein a projected surface area of the reversibly deformable closure is increased by about 100% when the closure is disposed over an opening compared to the projected surface area of the closure in a storage position.

4. The apparatus of claim 1, wherein a projected surface area of the reversibly deformable closure is increased by at least about 100% when the closure is disposed over an opening compared to the projected surface area of the closure in a storage position.

5. The apparatus of claim 1, wherein at least one of the reversibly deformable closures comprises a fold for reversibly deforming the closure between the covering position and the storage position.

6. The apparatus of claim 5, wherein the fold comprises a hinge.

7. The apparatus of claim 1, wherein the plurality of containers, plurality of closures, or both the plurality of containers and the plurality of closures consist essentially of food grade materials.

8. The apparatus of claim 7, wherein the food grade materials are plastic.

9. The apparatus of claim 1, wherein the plurality of containers, plurality of closures, or both the plurality of containers and the plurality of closures are at least one-sixteenth of an inch thick.

10. The apparatus of claim 1, wherein each of the plurality of closures has a surface area of between about 64 square inches and about 1000 square inches when disposed over one of the openings.

11. The apparatus of claim 1, wherein the plurality of containers are identical to each other and the plurality of closures are identical to each other.

12. The apparatus of claim 1, wherein each of the plurality of containers have a volume and are nested so that a first container nested inside a second container occupies between about 25% and about 95% of the volume of the second container.

13. A method of storing a plurality of shape stable storage containers, the method comprising nesting the plurality of shape stable containers with each other with a detachable and reversibly deformable closure disposed between the plurality of containers and entirely within one of the containers, wherein the plurality of containers each comprise an opening of the same dimension and the detachable and reversibly deformable closure may be reversibly fastened to the container to cover the opening to thereby form a substantially watertight seal with the container, wherein at least one of the reversibly deformable closures comprises a nondeformable portion.

14. The method of claim 13, further comprising reversibly deforming the reversibly deformable closure so that a projected surface area of the reversibly deformable closure is increased by about 100% when the closure is disposed over an opening compared to the projected surface area of the closure disposed between the containers in a storage position.

15. The method of claim 14, wherein at least one of the reversibly deformable closures comprises a fold for reversibly deforming the closure from a storage position wherein the closure is disposed between the containers to a covering position to cover the opening.

16. The method of claim 13, wherein the plurality of containers, plurality of closures, or both the plurality of containers and the plurality of closures consist essentially of food grade materials.

17. The method of claim 13, wherein each of the plurality of closures has a surface area of between about 64 square inches and about 1000 square inches when disposed over one of the openings.

18. The method of claim 13, wherein the plurality of containers are identical to the other.

19. A storage apparatus having a container with an opening and a closure reversibly deformable between a storage position and a covering position for covering the opening, the apparatus comprising:
a shape stable storage container having an opening and being nestable with other shape stable containers of identical size and shape, and
a reversibly deformable closure for covering the opening in a covering position to thereby form a substantially watertight seal with the container that is detachable from the container and is reversibly deformable by folding from the covering position to a storage position,
wherein the closure comprises a nondeformable portion and has a projected surface area in the storage position that is less than a projected surface area of the closure in the covering position such that the closure is storable inside the container while other containers of identical size and shape are nested in the container wherein the reversibly deformable closure comprises a fold for reversibly deforming the closure from the storage position to the covering position, and wherein a projected surface area of the reversibly deformable closure is increased by at least about 50% when the closure is disposed over an opening compared to the projected surface area of the closure in a storage position wherein the closure is disposed entirely within the container.

20. The apparatus of claim 19, wherein a projected surface area of the reversibly deformable closure is increased by at least about 100% when the closure is disposed over an opening compared to the projected surface area of the closure in a storage position wherein the closure is disposed entirely within the container.

21. The apparatus of claim 19, wherein the fold comprises a hinge.

22. The apparatus of claim 19, wherein each of the plurality of closures has a surface area of between about 64 square inches and about 1000 square inches when disposed over one of the openings.

23. The apparatus of claim 19, wherein the container and the closure are made only of materials that are food grade materials.

\* \* \* \* \*

UNITED STATES PATENT AND TRADEMARK OFFICE
CERTIFICATE OF CORRECTION

| | | |
|---|---|---|
| PATENT NO. | : 7,303,075 B2 | Page 1 of 1 |
| APPLICATION NO. | : 11/580355 | |
| DATED | : December 4, 2007 | |
| INVENTOR(S) | : Curtis B. Herbert and James C. Kolar | |

It is certified that error appears in the above-identified patent and that said Letters Patent is hereby corrected as shown below:

On the Title Page, Item
Please insert the following information:

--Related U.S. Application Data:

(63)    Continuation-in-part of application No. 10/974,553, filed Oct. 27, 2004, now U.S. Pat. No. 7,124,891.

(60)    Provisional application No. 60/514,956, filed on Oct. 28, 2003, provisional application No. 60/514,940, filed on Oct. 28, 2003.--

Signed and Sealed this

Ninth Day of December, 2008

JON W. DUDAS
*Director of the United States Patent and Trademark Office*